US005426080A

United States Patent [19]
Kundsen et al.

[11] Patent Number: 5,426,080
[45] Date of Patent: * Jun. 20, 1995

[54] OLEFIN POLYMERIZATION

[75] Inventors: Ronald D. Kundsen, Bartlesville; Gil R. Hawley; Dennis R. Kidd, both of Dewey; Randall A. Porter, Bartlesville, all of Okla.

[73] Assignee: Phillips Petroleum Company, Bartlesville, Okla.

[*] Notice: The portion of the term of this patent subsequent to Mar. 30, 2010 has been disclaimed.

[21] Appl. No.: 234,770

[22] Filed: Apr. 28, 1994

Related U.S. Application Data

[62] Division of Ser. No. 813,169, Dec. 24, 1991, Pat. No. 5,338,812.

[51] Int. Cl.⁶ ............................................... C08F 4/26
[52] U.S. Cl. ..................................... 502/151; 502/155
[58] Field of Search ................................ 502/151, 155

[56] References Cited

U.S. PATENT DOCUMENTS

| | | | |
|---|---|---|---|
| 3,324,092 | 6/1967 | Naarmann et al. | 526/147 |
| 3,454,538 | 7/1969 | Naarmann et al. | 526/171 |
| 3,637,636 | 1/1972 | Bauer et al. | 526/171 |
| 3,759,889 | 9/1973 | Bauer et al. | 526/130 |
| 4,721,696 | 1/1988 | Kidd | 502/210 |
| 4,759,330 | 7/1988 | Kidd | 208/213 |
| 5,037,911 | 8/1991 | McDaniel et al. | 526/130 |
| 5,198,512 | 3/1993 | Jackson et al. | 526/130 |

FOREIGN PATENT DOCUMENTS 1251954 10/1967 Germany.

Primary Examiner—Edward J. Smith
Attorney, Agent, or Firm—Charles W. Stewart

[57] ABSTRACT

A novel polymerization catalyst system comprising a diluent, a substrate, a nickel compound wherein the nickel is in a zero oxidation state and picolinic acid and a method for making such catalyst system is described. The polymerization catalyst system can be used in a process for the polymerization of polymerizable olefins.

14 Claims, No Drawings

OLEFIN POLYMERIZATION

This application is a divisional of application Ser. No. 07/813,169, filed Dec. 24, 1991, now U.S. Pat. No. 5,338,812.

This invention relates to olefin polymerization.

In one of its more specific aspects, this invention relates to a polymerization process and a novel polymerization catalyst system.

Olefin polymerization technology has long been developing with much of the efforts of those skilled in the art of olefin polymerization technology being towards the development and improvement of the solid component of polymerization catalysts. The most common metal catalyst used in olefin polymerization is chromium, but others such as titanium have been suggested by the art. However, only a very few metals have been suggested by the art as being suitable for use as polymerization catalysts.

It is thus an object of this invention to provide a novel catalyst system that suitably promotes the polymerization of olefin hydrocarbons.

Another object of this invention is to provide a process for the polymerization of olefin hydrocarbons.

A further object of this invention is to provide a novel method of preparing a catalyst system that can be utilized to promote the polymerization of olefins.

In accordance with one aspect of this invention, a catalyst system is provided that comprises a diluent, a substrate, a nickel compound wherein the nickel is in a zero oxidation state, and a pyridine component.

In accordance with another aspect of this invention, a polymerization process is provided which utilizes a catalyst system that comprises a diluent, a substrate, a nickel compound wherein the nickel is in a zero oxidation state, and a pyridine component.

In accordance with still another aspect of this invention, the inventive catalyst system is prepared by the steps comprising mixing an acidified slurry of aluminum oxide hydroxide with a silicate solution followed by the addition of a base to form a silicated alumina gel comprising silica. A slurry of the silicated alumina gel and a diluent is formed and incorporated therein is a nickel compound in combination with a pyridine component.

Other aspects, objects and the several advantages of this invention will be readily apparent form a study of the disclosure and the appended claims.

The catalyst system of this invention comprises, consists of, or consists essentially of a diluent, a substrate, a nickel compound wherein the nickel is in a zero oxidation state, and a pyridine component. The diluent component of the catalyst system can be any inert diluent or medium which can suitably be used to maintain the substrate of the catalyst system in suspension during the polymerization process in which the catalyst system is utilized. The diluent aids in the contacting of the monomer or monomers with the active polymerization catalyst. The diluents can include aliphatic or aromatic hydrocarbons having from 3 to 12 carbon atoms. A preferred diluent can be selected from the group consisting of benzene, xylene, toluene, cyclohexane, paraffinic hydrocarbons having from 4 to 12 carbon atoms and mixtures of two or more thereof.

The term "substance" as used herein is not to be narrowly interpreted as being a mere inert component of the catalytic system. It is believed, without wanting to be bound to any particular theory, that while the substrate does not specifically react with the polymerizable olefins of the polymerization reaction, due to its physical properties and the manner in which it cooperates with the metal catalyst component of the catalytic system, the type and physical properties of the substrate can impart or enhance the polymerization activity of the catalytic system. Any material generally known in the art as a suitable catalyst substrate and which will cooperate with the nickel compound and pyridine components of the catalyst system in a manner such that olefin polymerization activity is achieved can be utilized. It has been found that preferred materials for use as the substrate of the catalyst system can be selected from the group consisting of alumina, silica, silicated alumina gel and mixtures of two or more thereof. The most preferred substrate for use in the catalyst system of this invention, however, is a silicated alumina gel as prepared by the methods described at length herein.

The specific nickel compound utilized as a component of the catalyst system is a critical feature or element of this invention in that it is believed that there are no known nickel polymerization catalyst systems that use a nickel catalyst that does not have a phosphine or arsenic ligand on the metal atom. It is believed that it is the specific interaction of the nickel compound of the catalyst system in combination with the pyridine component with the substrate which provides for the polymerization catalytic activity that is observed with this invention. The preferred nickel compound component of this invention is one that does not comprise a phosphine or an arsine ligand but has a nickel atom in the zero oxidation state. The most preferred nickel compound for use in this invention is known by its chemical name bis(1,5-cyclooctadiene) nickel(0).

The chemical compounds that can suitably be used as the pyridine component of the catalyst system are pyridine based compounds having the following structural formula:

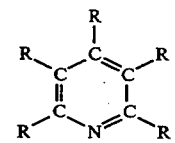

wherein C is a carbon atom, N is a nitrogen atom, and R can be one of either hydrogen, an alkyl group or a carboxylic acid group. The preferred compounds for use as the pyridine component of the catalyst system are pyridine carboxylic acid compounds. The most preferred pyridine component of the catalyst system is picolinic acid.

The term "picolinic acid" as used throughout this specification refers to the chemical compound pyridine-2-carboxylic acid, which has the chemical formula of $C_6H_5O_2N$ and the chemical structure as follows:

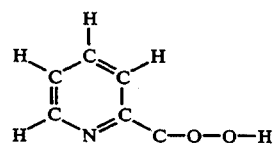

The most preferred substrate material for use in the invention is a silicated alumina gel that is prepared by mixing an acidified slurry of boehmite or aluminum oxide hydroxide, AlO(OH), with a silicate solution followed by the addition of a base suitable for inducing the formation of a silicated alumina gel comprising, consisting of, or consisting essentially of silica. The silicated alumina gel is recovered and is utilized as the substrate of the invention.

The acidified slurry of boehmite can be prepared by mixing with a suitable solvent, by any suitable means known in the art, a boehmite material that is reduced in size to form a suitably sized fine powder for forming a slurry. It is generally desirable that the solvent used in preparing the acidified slurry of boehmite be water and that the amount of starting boehmite material be present in the slurry in an amount in the range of from about 10 grams boehmite to about 200 grams boehmite per 1000 grams water. However, it is possible, if the conditions warrant, for the weight ratio of boehmite to water in the boehmite slurry to exceed 200 grams boehmite per 1000 grams water. A preferred range for the amount of boehmite in the aqueous slurry is from about 25 grams boehmite to about 150 grams boehmite per 1000 grams water; but, the most preferred weight ratio of boehmite to water in the boehmite slurry is in the range of from 50 grams boehmite to 100 grams boehmite per 1000 grams water.

The boehmite material is dispersed in the solvent by adding an acid or acidifying agent to acidify the slurry and to form the acidified slurry of boehmite. Any acid can be utilized to form the acidified slurry of boehmite that suitably gives a slurry with the desired properties. It is preferred, however, that the acid be selected from the group consisting of nitric acid, sulfuric acid, hydrochloric acid, acetic acid and mixtures of two or more thereof. The most preferred acid for use as an acidifying agent is nitric acid ($HNO_3$). The amount of acid employed in acidifying the mixture of boehmite and solvent can be any amount suitable for and effective in dispersing the boehemite in the solution and can range from about 1 gram concentrated acid to about 50 grams concentrated acid per 1000 grams of solvent.

Upon the preparation of the acidified slurry of boehmite, a silicate solution is added to the slurry and mixed sufficiently to provide a homogeneous mixture. The silicate solution used in forming the homogeneous mixture is preferably a solution of sodium silicate and water. The sodium silicate solution is prepared by acidifying a dilute aqueous mixture of sodium silicate with any suitable acid that will cause a solution, but not a gel, to be formed. The aqueous mixture of sodium silicate will generally comprise from about 1 gram sodium silicate to about 80 grams sodium silicate per 100 grams water. Preferably, the aqueous mixture of sodium silicate will have from about 10 grams sodium silicate to about 70 grams sodium silicate per 100 grams water; but, most preferably, the weight ratio of sodium silicate per water in the aqueous mixture of sodium silicate is from 20 to 60. It is preferred that the agent used to acidify the aqueous mixture of sodium silicate to form the silicate solution be an acid selected from the group consisting of nitric acid, sulfuric acid, hydrochloric acid, acetic acid and mixtures of two or more thereof. The most preferred acidifying agent or acid, however, is nitric acid ($HNO_3$). The amount of acid employed in acidifying the aqueous mixture of sodium silicate can be any suitable amount necessary to form the solution; but, preferably, it is an amount such as to give a solution having a pH in the range of from about 1 to about 3. Most preferably, the amount of acid utilized will be that amount necessary to provide a silicate solution pH of from 1.5 to 2.0

Any suitable method known in the art can be used to suitably mix the acidified slurry of boehmite and the silicate solution to form a homogenized mixture or mixture. The mixing or blending time can range upwardly to 60 minutes, but it is generally less than 60 minutes. Preferably, the mixing time will be in the range of from about 2 minutes to about 30 minutes. Upon the preparation of the homogenized mixture, a base compound is added to the mixture which is suitable for inducing the formation of a gel material comprising, consisting of, or consisting essentially of silicated alumina. Example of base compounds suitable for inducing the formation of the gel include, but are not limited to, alakli metal hydroxides, ammonium hydroxide, ammonia, and urea. Ammonium hydroxide is the preferred base compound.

The gel formed by aforedescribed process can be utilized as the most preferred substrate of the invention described herein. The gel or silicated alumina gel is recovered by any suitable means known in the art such as, for example, filtration, and thereafter washed to remove sodium ions and other surface impurities or contaminants. The washed silicated alumina gel is then dried to remove water by any suitable means known in the art. Spray drying methods are among the suitable drying methods that can be used to dry the washed gel. Examples of such suitable spray drying methods and apparatuses are listed and described in *Perry's Chemical Engineers' Handbook, Sixth Edition*, Edited by D. W. Green (McGraw-Hill, 1984) at pp. 20-54 through 20-58.

It has been discovered that the catalytic activity of the catalyst system described herein toward polymerization of olefins is unexpectedly improved by use of a silicated alumina gel substrate over the activity which occurs by use of an alumina substrate. It is further noted that polymerization activity improves by increasing the amount of silica contained in the silicated alumina gel substrate of this invention. While not wanting to be bound by any particular theory concerning the reason why the catalytic activity of the catalyst system is improved with increasing quantities of silica that is contained in the silicated alumina gel, it is theorized that the presence of silica in the silicated alumina gel has an affect upon the pore structure of the substrate that positively impacts the olefin polymerization reaction. Generally, the activity of the catalyst system toward promoting olefin polymerization is improved as the presence of silica contained in the silicated alumina gel is increased upwardly to about 75 weight percent of the total weight of the silicated alumina gel and perhaps greater than 75 weight percent depending upon the type and physical properties of alumina used in the preparation of the silicated alumina. However, the preferred amount of silica contained in the silicated alumina gel substrate is in the range of from about 10 weight percent to about 75 weight percent of the silicated alumina gel. Most preferably, the amount of silica contained in the silicated alumina gel substrate can range from about 15 weight percent to about 66 weight percent.

The silicated alumina gel prepared by the method described herein typically will have pore sizes in the range of about 300–800 Å, pore volumes in the range of about 0.4 to 1.25 cc/gram and surface areas in the range of about 200 to 350 $m^2$/gram. The value representing "pore volume", as referred to herein, is determined by the method of mercury intrusion porosimetry as completely described by the ASTM method D4284-88 entitled "Standard Test Method for determining Pore Volume Distribution of Catalysts By Mercury Intrusion Porosimetry". This standard ASTM test method D4284-88 is incorporated herein and made a part hereto by reference. The values provided herein for surface area are determined by the ASTM Method D3663-84 entitled "Standard Test Method for Surface Area of Catalysts". This standard ASTM test D3663-84 is incorporated herein and made a part hereto by reference. The pore size values referred to herein are calculated based upon the measured values for pore volume and surface area.

The catalyst system of this invention can be used to polymerize at least one mono-1-olefin containing about 2 to about 8 carbon atoms per molecule, preferably ethylene, propylene, 1-butene, 1-pentene, 1-hexene, 4-methyl-1-pentene, and 1-octene. The invention is most preferred in producing ethylene homopolymers. The invention may also be used in the production of copolymers from mixtures of ethylene and of one or more comonomers selected from 1-olefins containing 3 to 8 carbon atoms per molecule. Exemplary comonomers include aliphatic 1-olefins, such as propylene, 1-butene, 1-pentene, 1-hexene, 4-methyl1-pentene, 1-octene and other higher olefins and non-conjugated diolefins such as 1,4-pentadiene, 1,5-hexadiene, and other such diolefins and mixtures thereof.

The polymers are preferably prepared by a slurry polymerization process whereby the polymerizable olefins are contacted with a slurry of the inert diluent or medium and the substrate with the slurry having contained therein the nickel compound catalyst and a concentration of a pyridine component. An in-situ preparation of the catalyst system is made by adding to the slurry of diluent and substrate the nickel compound wherein the nickel is in a zero oxidation state and a pyridine component. Any means suitable for preparing the catalyst system can be used, but it is important that the substrate, nickel compound and pyridine component be present in the catalyst system in appropriate concentrations so as to promote the polymerization of the polymerizable olefins that are contacted with the catalyst system. Generally, the substrate will be present in the diluent in the form of finely divided, suspended solids in the range of from about 0.01 grams to about 100 g grams substrate per 100 grams diluent. The nickel compound in combination with the pyridine component is dispersed in the diluent in an amount such that the nickel metal will be present in the range of from about 0.1 grams to about 10 grams nickel metal per 100 grams substrate. Preferably, the amount of nickel compound dispersed in the diluent can be such that the amount of nickel metal in the diluent will range from about 0.2 grams nickel metal to about 5.0 grams nickel metal per 100 grams substrate. Most preferably, the amount of nickel compound dispersed in the diluent will be such that the nickel metal will be present from 0.5 grams nickel metal to 2.5 grams nickel metal per 100 grams substrate. The quantity of the pyridine component utilized in the catalyst system will depend upon the amount of nickel compound present in the diluent with the molar ratio of the pyridine component to the nickel compound being in the range of from about 0.25:1 to about 2.0:1. The preferred molar ratio of the pyridine component to nickel compound is in the range of from about 0.5:1 to about 1.5:1 and, most preferably, the molar ratio can range from 0.75:1 to 1.25:1.

The process of this invention is generally carried out under conditions suitable for the polymerization of polymerizable olefins. For predominantly ethylene polymers, a temperature of about 60° C. to 110° C. is employed. The process pressure can vary from about 110 psia to about 700 psia (0.76–4.8 MPa) or higher. The substrate is kept in suspension in the diluent and the catalyst system is contacted with the monomer or monomers are sufficient pressure to maintain the diluent or medium and at least a portion of the monomer or monomers in the liquid phase. The medium and temperature are thus selected such that the polymer is produced as solid particles and is recovered in that form. Generally in slurry polymerization of ethylene homopolymer or predominantly ethylene copolymer systems, the feasible temperature range is 66° C. to 110° C. (150° F. to 230° F.).

The following examples are presented to further illustrate the invention.

EXAMPLE I

This example illustrates the method of preparation of the silicated alumina substrate employed as a component of the catalyst system of this invention.

The boehmite starting materials came from two main commercial sources. Catapal A and Catapal D were obtained from Vista Chemical while Pural 200, Pural 400, and Pural 40/200 were obtained from Condea Chemie. The sodium silicate used in the silication of the boehmite starting materials were obtained from Brainard Chemical.

The basic method for the silication of a boehmite consisted of slurrying about 60.9 grams of the boehmite, AlO(OH), in about 1.0 liter of water, then adding 10 ml of concentrated nitric acid, $HNO_3$, to disperse the AlO(OH). This was stirred for ten minutes prior to adding the silicate solution. The silicate solution was prepared by diluting about 44.0 grams of sodium silicate with about 132 grams of water followed by rapidly adding 50 ml of concentrated $HNO_3$ while vigorously stirring the solution. The silicate solution was then added to the AlO(OH) slurry, stirred for ten minutes and then gelled by adding 100 ml of $NH_4OH$. After stirring an additional 10 minutes, the mixture was filtered and washed with four 1 liter portions of $H_2O$. The first washing also contained 30 grams of $NH_4NO_3$ to aid in Na cation removal. The samples were dried for 3 hrs. at 100° C. or spray dried with a 95° C. outlet temperature. Samples for pore size analysis were calcined at 500° C. for 3 hrs. Nitrogen pore size distributions were determined on a Quantachrome-6 instrument. Surface areas were determined by multi-point BET methods using the Quantachrome-6. Mercury pore size distributions were determined by the intrusion method.

EXAMPLE II

This example demonstrates the use of the catalyst system in the polymerization of polymerizable olefins, and it further illustrates the improvement in catalytic activity achievable by use of a silicated alumina substrate in the catalyst system of this invention.

Ethylene was polymerized in a standard stirred stainless steel reactor. The reactor was charged with about 350 ml toluene and the specific alumina or silicated alumina substrate listed in Table I below with the preparation of each substrate being generally described in Example I. Following the charging of the reactor with the diluent and substrate, a quantity ranging form 0.05 grams to 0.15 grams of bis(1,5-cyclooctadiene) nickel(0) and a quantity of picolinic acid ranging from 0.032 grams to 0.084 grams were added to the slurry of substrate and diluent. Upon mixing of the catalyst system components, ethylene was charged to the reactor under reaction conditions such that the pressure was maintained at approximately 500 psig and the reaction temperature ranged from about 20° C. to about 35° C. The results from the polymerization experiments utilizing the various types of catalyst system substrates are presented in Table I. The melt index (MI) of the polymer produced by the method of this example was determined in accordance with ASTM D1238, condition 190/2.16 and its high load melt index (HLMI) was determined in accordance with ASTM D1238, condition 190/21.60.

TABLE I

| Substrate | | Activity (gm Ethylene Consumed per gm Nickel per hr.) | Melt Index min. | High Load Melt Index (g/10 min.) |
|---|---|---|---|---|
| A: | Catapal D Alumina | 281 | 0 | 0.8 |
| B: | 25% Silicated Catapal D | 1264 | 1.7 | 145 |
| C: | 50% Silicated Catapal D | 3108 | 7.7 | 427 |
| D: | Pural 400 Alumina | 593 | 0 | 0.7 |
| E: | 25% Silicated Pural 400 | 1019 | 0.02 | 5.4 |
| F: | 50% Silicated Pural 400 | 154 | not available | not available |

The results from this experiment demonstrate that the catalyst system described herein is effective for promoting the polymerization of polymerizable olefins. The results further demonstrate the unexpected result that a silicated substrate prepared by the methods described herein can be used to enhance the catalytic activity of the aforementioned polymerization catalyst system.

Reasonable variations and modifications are possible witin the scope of this disclosure without departing from the scope and spirit thereof.

That which is claimed is:

1. A catalyst system comprising a diluent selected from the group consisting of benzene, xylene, toluene, cyclohexane, paraffin hydrocarbons having from 4 to 12 carbon atoms, and mixtures thereof, a silicated alumina gel substrate, bis(1,5-cyclooctadiene) nickel(0), and a pyridine carboxylic acid component having the structure formula:

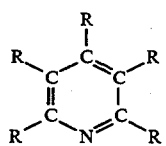

wherein C is a carbon atom, N is a nitrogen atom, and R can be one of either hydrogen, an alkyl group or a carboxylic acid group.

2. A catalyst system as recited in claim 1 wherein said pyridine component is picolinic acid.

3. A catalyst system as recited in claim 2 wherein said substrate is present in said diluent in the range of from about 0.01 grams to about 100 grams substrate per 100 grams diluent and said nickel compound in combination with said pyridine component is dispersed in said diluent in an amount such that nickel metal will be present in the range of from about 0.1 grams to about 10 grams nickel per 100 grams said substrate and the molar ratio of said nickel compound to said pyridine component is in the range of from about 0.5:1 to about 4:1.

4. A catalyst system as recited in claim 3 wherein said substrate is a silicated alumina gel containing silica in the range of from about 10 weight percent to about 75 weight percent based on the total weight of said silicated alumina gel.

5. A catalyst system as recited in claim 4 wherein said substrate is prepared by the steps comprising:
(a) mixing an acidified slurry of aluminum oxide hydroxide with a silicate solution to form a mixture;
(b) adding a base suitable for inducing the formation of a silicated alumina gel comprising silica, which can be utilized as said substrate, to said mixture.

6. A catalyst system as recited in claim 5 wherein said acidified slurry of aluminum oxide hydroxide is prepared by slurrying from about 10 grams to about 200 grams of aluminum oxide hydroxide in about 1000 grams of water followed by adding an acid compound suitable for and effective in dispersing the aluminum oxide hydroxide and wherein said silicate solution is prepared by diluting from about 1 gram to about 80 grams sodium silicate with about 100 grams water followed by adding an acid compound suitable for and effective in forming said silicate solution.

7. A method of preparing a catalyst system for use in a polymerization process comprising:
(a) mixing an acidified slurry of aluminum oxide hydroxide with a silicate solution to form a mixture;
(b) adding a base suitable for inducing the formation of a silicated alumina gel comprising silica;
(c) recovering said silicated alumina gel;
(d) washing said silicated alumina gel to remove contaminants;
(e) drying the thus washed silicated alumina gel;
(f) incorporating bis(1,5-cyclooctadiene) nickel(0) in combination with a pyridine carboxylic acid component having the structural formula:

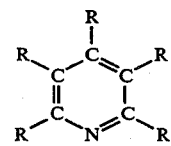

wherein C is a carbon atom, N is a nitrogen atom, and R can be one of either hydrogen an alkyl group or a carboxylic acid group into a slurry comprising said silciated alumina gel and a diluent selected from a group consisting of benzene, xylene, toluene, cyclohexane, paraffin hydrocarbons having from 4 to 12 carbon atoms, and mixtures thereof.

8. A method as recited in claim 7 wherein said pyridine component is picolinic acid.

9. A method as recited in claim 7 wherein the amount of nickel compound incorporated into said slurry is such as to provide an amount of nickel metal in said slurry in the range of from about 0.1 grams nickel metal to about 10 grams nickel metal per 100 grams of said silicated alumina gel, and the molar ratio of said nickel compound to said pyridine component in said slurry is in the range of from about 0.5:1 to about 4:1.

10. A method as recited in claim 9 wherein the silicated alumina gel contains silica in the range of from about 10 weight percent to about 75 weight percent based on the total weight of said silicated alumina gel.

11. A method of preparing a catalyst system, comprising:

(a) preparing a silicated alumina gel comprising silica, (b) incorporating bis(1,,5-cyclooctadiene) nickel(0) in combination with a pyridine carboxylic acid component having the structural formula:

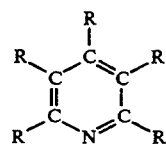

wherein C is a carbon atom, N is a nitrogen atom, and R can be one of either hydrogen, an alkyl group or a carboxylic acid group into a slurry comprising said silicated alumina gel and a diluent selected from a group consisting of benzene, xylene, toluene, cyclohexane, paraffin hydrocarbons having from 4 to 12 carbon atoms, and mixtures thereof.

12. A method as recited in claim 11 wherein said pyridine component is picolinic acid.

13. A method as recited in claim 12 wherein the amount of nickel compound incorporated into said slurry is such as to provide an amount of nickel metal in said slurry in the range of from about 0.1 grams nickel metal to about 10 grams nickel metal per 100 grams of said silicated alumina gel, and the molar ratio of said nickel compound to said pyridine component in said slurry is in the range of from about 0.5:1 to about 4:1.

14. A method as recited in claim 13 wherein the silicated alumina gel contains silica in the range of from about 10 weight percent to about 75 weight percent based on the total weight of said silicated alumina gel.

* * * * *